United States Patent
Lin

(10) Patent No.: US 8,346,008 B2
(45) Date of Patent: Jan. 1, 2013

(54) SYSTEMS AND METHODS FOR NOISE REDUCTION IN HIGH DYNAMIC RANGE IMAGING

(75) Inventor: Peng Lin, Pleasanton, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 873 days.

(21) Appl. No.: 12/480,970

(22) Filed: Jun. 9, 2009

(65) Prior Publication Data

US 2010/0310190 A1 Dec. 9, 2010

(51) Int. Cl.
*G06K 9/40* (2006.01)
*H04N 5/217* (2006.01)
(52) U.S. Cl. .................. 382/274; 382/260; 348/241
(58) Field of Classification Search .............. 382/274, 382/275, 260, 167, 168; 348/241, 273, 222.1, 348/296, 297
See application file for complete search history.

(56) References Cited

U.S. PATENT DOCUMENTS

| 7,009,636 B2* | 3/2006 | Liu et al. ................ 348/208.1 |
| 2004/0165091 A1* | 8/2004 | Takemura et al. ............ 348/296 |
| 2009/0059039 A1 | 3/2009 | Smith et al. |
| 2009/0268963 A1* | 10/2009 | Kang et al. ................ 382/168 |
| 2010/0157078 A1* | 6/2010 | Atanassov et al. ......... 348/222.1 |

* cited by examiner

*Primary Examiner* — Yon Couso
(74) *Attorney, Agent, or Firm* — Kramer Levin Naftalis & Frankel LLP

(57) ABSTRACT

This is generally directed to systems and methods for noise reduction in high dynamic range ("HDR") imaging systems. In some embodiments, multiple images of the same scene can be captured, where each of the images is exposed for a different amount of time. An HDR image may be created by suitably combining the images. However, the signal-to-noise ratio ("SNR") curve of the resulting HDR image can have discontinuities in sections of the SNR curve corresponding to shifts between different exposure times. Accordingly, in some embodiments, a noise model for the HDR image can be created that takes into account these discontinuities in the SNR curve. For example, a noise model can be created that smoothes the discontinuities of the SNR curve into a continuous function. This noise model may then be used with a Bayer Filter or any other suitable noise filter to remove noise from the HDR image.

18 Claims, 7 Drawing Sheets

| | | | | |
|---|---|---|---|---|
| G(-2,2) 505 | B(-1,2) | G(0,2) 509 | B(1,2) | G(2,2) 514 |
| R(-2,1) | G(-1,1) 507 | R(0,1) | G(1,1) 511 | R(2,1) |
| G(-2,0) 504 | B(-1,0) | G(0,0) 502 | B(1,0) | G(2,0) 513 |
| R(-2,-1) | G(-1,-1) 506 | R(0,-1) | G(1,-1) 510 | R(2,-1) |
| G(-2,-2) 503 | B(-1,-2) | G(0,-2) 508 | B(1,-2) | G(2,-2) 512 |

| | | | | | | | | | | |
|---|---|---|---|---|---|---|---|---|---|---|
| G(-2,-5) | B(-1,-5) | G(0,-5) | B(1,-5) | G(2,-5) |
| R(-2,-4) | G(-1,-4) | R(0,-4) | G(1,-4) | R(2,-4) |
| G(-2,-3) | B(-1,-3) | G(0,-3) | B(1,-3) | G(2,-3) |
| R(-2,-2) | G(-1,-2) | R(0,-2) | G(1,-2) | R(2,-2) |
| G(-2,-1) | B(-1,-1) | G(0,-1) | B(1,-1) | G(2,-1) |
| R(-2,0) | G(-1,0) | R(0,0) 602 | G(1,0) | R(2,0) |
| G(-2,1) | B(-1,1) | G(0,1) | B(1,1) | G(2,1) |
| R(-2,2) | G(-1,2) | R(0,2) | G(1,2) | R(2,2) |
| G(-2,3) | B(-1,3) | G(0,3) | B(1,3) | G(2,3) |
| R(-2,4) | G(-1,4) | R(0,4) | G(1,4) | R(2,4) |

600

| B(-2,-4) | G(-2,-3) | B(-2,-2) | G(-2,-1) | B(-2,0) | G(-2,1) | B(-2,2) | G(-2,3) | B(-2,4) | G(-2,5) |
|---|---|---|---|---|---|---|---|---|---|
| G(-1,-4) | R(-1,-3) | G(-1,-2) | R(-1,-1) | G(-1,0) | R(-1,1) | G(-1,2) | R(-1,3) | G(-1,4) | R(-1,5) |
| B(0,-4) | G(0,-3) | B(0,-2) | G(0,-1) | B(0,0) 702 | G(0,1) | B(0,2) | G(0,3) | B(0,4) | G(0,5) |
| G(1,-4) | R(1,-3) | G(1,-2) | R(1,-1) | G(1,0) | R(1,1) | G(1,2) | R(1,3) | G(1,4) | R(1,5) |
| B(2,-4) | G(2,-3) | B(2,-2) | G(2,-1) | B(2,0) | G(2,1) | B(2,2) | G(2,3) | B(2,4) | G(2,5) |

SYSTEMS AND METHODS FOR NOISE REDUCTION IN HIGH DYNAMIC RANGE IMAGING

FIELD OF THE INVENTION

The present invention relates to systems and methods for noise reduction in high dynamic range imaging. In particular, the present relates to systems and methods for noise reduction in high dynamic range images produced through a multiple exposure method.

BACKGROUND OF THE INVENTION

The dynamic range of an imaging system can be defined by the range of light intensity levels that can be effectively captured by that system. In standard imaging systems (e.g., single-exposure systems), the system may be able to effectively capture only a small range of light intensity levels. For example, when an imaging system utilizes a short exposure time to produce an image, low-light intensity levels may be ineffectively captured. This may, for example, produce an image in which low-light intensity features (e.g., shadows or night scenery) are underexposed and lose detail. As another example, when an imaging system utilizes a long exposure time to produce an image, high-light intensity levels may be ineffectively captured. In this case, an image may be produced in which high-light intensity features (e.g., bright lights or light reflections) are overexposed and thus ineffectively captured.

Accordingly, in order to expand the dynamic range of a system, several techniques have been developed for producing high dynamic range ("HDR") images in which a wider range of light intensity levels can be effectively captured. One of these techniques is the multiple-exposure method. In the multiple-exposure method, two or more images of the same scene can be captured, where the images are each exposed for a different amount of time. A final image may then be created by combining these multiple exposures. For example, in some multiple-exposure methods, a final image can be created by summing weighted pixel values from each of the exposures. Such an HDR system may, for example, clearly capture image features that range from dark shadows to bright lights.

BRIEF DESCRIPTION OF THE FIGURES

FIGS. 5-7 show illustrative Bayer pixel arrays in accordance with some embodiments of the invention.

DETAILED DESCRIPTION OF THE INVENTION

Figure 1:
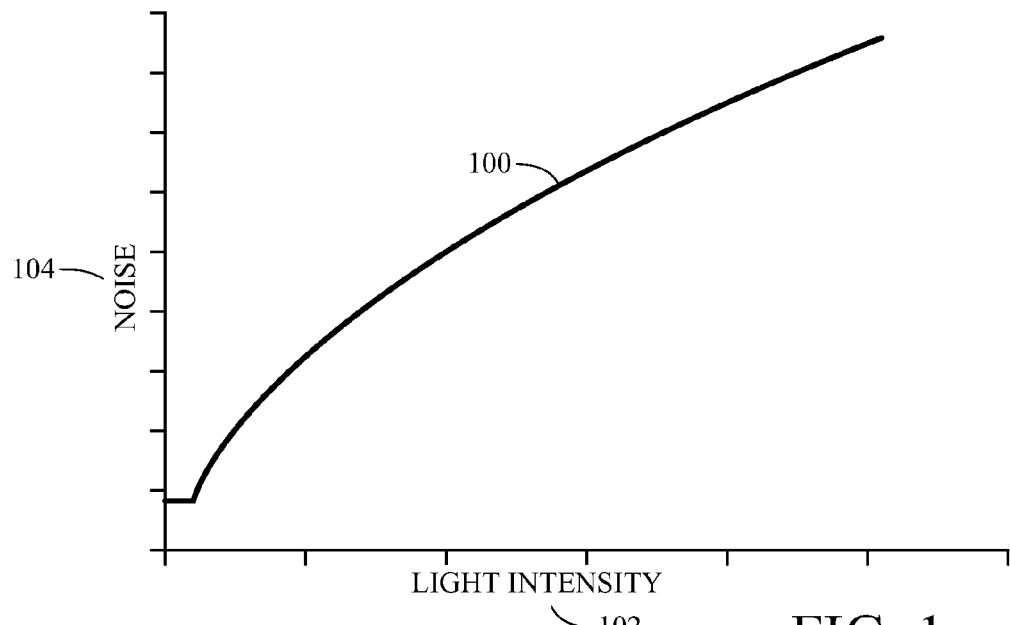
FIG. 1 shows an illustrative signal-noise curve in accordance with some embodiments of the invention.

Discussed herein are systems and methods for reducing noise in high dynamic range ("HDR") images. Generally, noise in an imaging system can depend upon the image signal and upon characteristics of that imaging system. For example, an imaging system can typically consist of an array of pixel cells. The pixel cells can each produce an image signal corresponding to the intensity of the light sensed by that pixel cell (e.g., the number of incident photons on that pixel cell). The amount of noise present in this image signal may vary based on the intensity of the sensed light. For example, FIG. 1 shows signal-noise curve 100 of an image signal that can be produced by a pixel cell of an imaging system. Based on the value of light intensity 102 sensed by the pixel cell, the amount of noise 104 present in the image signal can vary.

In addition to being signal dependant, the noise in an imaging system can depend upon characteristics of that imaging system. For example, the values of a signal-noise curve of a complimentary metal-oxide semiconductor ("CMOS") imaging system can be related to characteristics such as the system's analog gain, conversion gain, saturation signal, noise floor, or any other suitable characteristics. When not otherwise stated, the descriptions and figures herein are described in reference to a CMOS imaging system. However, one skilled in the art can appreciate that the various embodiments described herein could be applied to other imaging systems such as, for example, a charge-coupled device ("CCD") imaging system, or any other suitable imaging system.

In order to effectively filter noise from an image, a system should estimate an appropriate amount of noise to remove from the image signal. For example, overestimating the amount of noise to remove from an image signal can result in an over-filtered image in which image detail is lost. As another example, underestimating the amount of noise to remove from an image signal can result in an under-filtered image that still retains noise. Moreover, since the amount of noise in an image signal can change based on the value of that image signal (e.g., based on the sensed light intensity), the filter can adapt the appropriate amount of noise to remove based on the sensed light intensity. In order to determine an appropriate amount of noise to remove from an image signal, a suitable noise model for the imaging system should be used.

As mentioned above, the amount of noise in an imaging system can depend upon the image signal (e.g., the number of incident photons or sensed light intensity) and upon characteristics of the imaging system. The number of photons incident upon a pixel cell is essentially a random process that obeys Poisson statistics. Accordingly, the standard deviation of the incident photons (e.g., the noise or uncertainty of the image signal) may be described by:

$$\sigma = K \cdot \sqrt{I} \quad (1)$$

where I is the number of incident photons and K is a noise model coefficient that can be calculated from characteristics of the imaging system. Ways of calculating K will be described in more detail below. To model the noise for a CMOS imaging system, Equation (1) can be modified into:

$$\sigma_i = \max(\sigma_0, K \cdot \sqrt{G_a \cdot I_i}) \quad (2)$$

In an imaging system, the pixel cells can be designed such that each pixel cell can sense the light intensity for a single color (e.g., red, green, or blue). For example, in some embodiments, the light incident upon a pixel cell can be filtered such that the pixel cell only receives red, green, or blue light. As another example, a pixel cell may be designed such that it only responds to red, green, or blue light. Accordingly, the noise model for an imaging system may include a separate noise model for each color. In Equation (2), $\sigma_i$ (i=red, green, blue) is the noise model for the corresponding color, $\sigma_0$ is the noise floor, K is the noise model coefficient, $G_a$ is the analog gain of the imaging system, and $I_i$ (i=red, green, blue) is the image signal level for the corresponding color (e.g., the number of incident photons). The analog gain, $G_a$, can be determined from camera settings of the imaging system during the image capture. The noise floor, $\sigma_0$, and noise model coefficient, K, can be determined by:

$$\sigma_0 = \frac{\text{read\_noise} \cdot \text{conv\_gain} \cdot (2^{ADC\_bit\_depth} - 1)}{\text{satu\_signal}} \quad (3)$$

$$K = \sqrt{\frac{\text{conv\_gain} \cdot (2^{ADC\_bit\_depth} - 1)}{\text{satu\_signal}}} \quad (4)$$

where the read noise of an imaging system, read_noise, can be measured in electron volts (c⁻) and refers to the residual noise of a pixel cell when photon shot noise is excluded. The conversion gain of the pixel cell, conv_gain, can be expressed in volts over electron volts (V/e⁻) and can refer to the sensitivity of a pixel cell in converting incident photons into an electronic signal. ADC_bit depth is the number of bits of the analog-to-digital converter of the imaging system. The saturation signal of a pixel cell, satu_signal, can be measured in volts (V).

Equation (2) may be used to calculate a noise model for a single-exposure imaging system such as, for example, the noise model represented by signal-noise curve 100 of FIG. 1.

Figure 2:
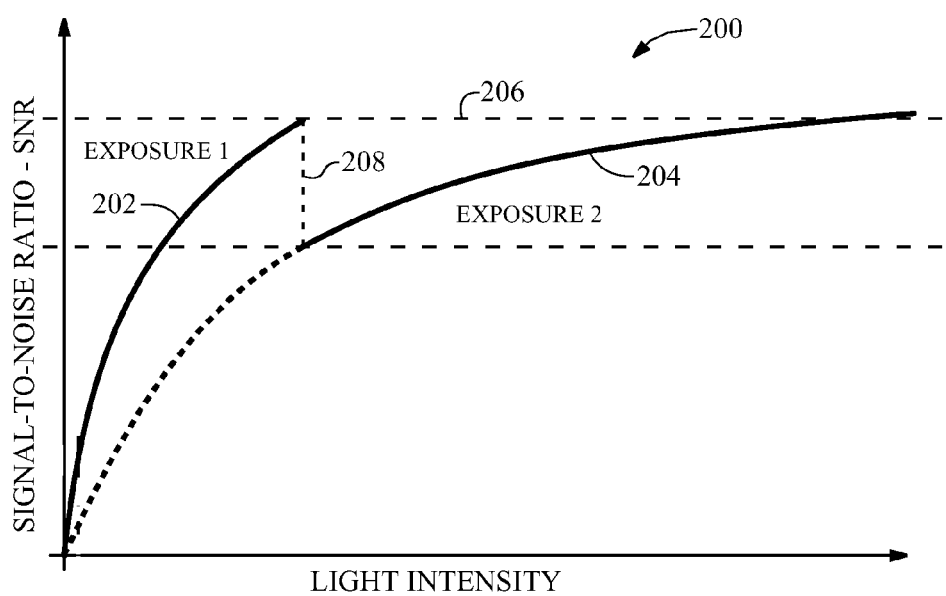
FIGS. 2-4 show illustrative signal-to-noise ratio graphs for high dynamic range images in accordance with some embodiments of the invention.
Figure 3:
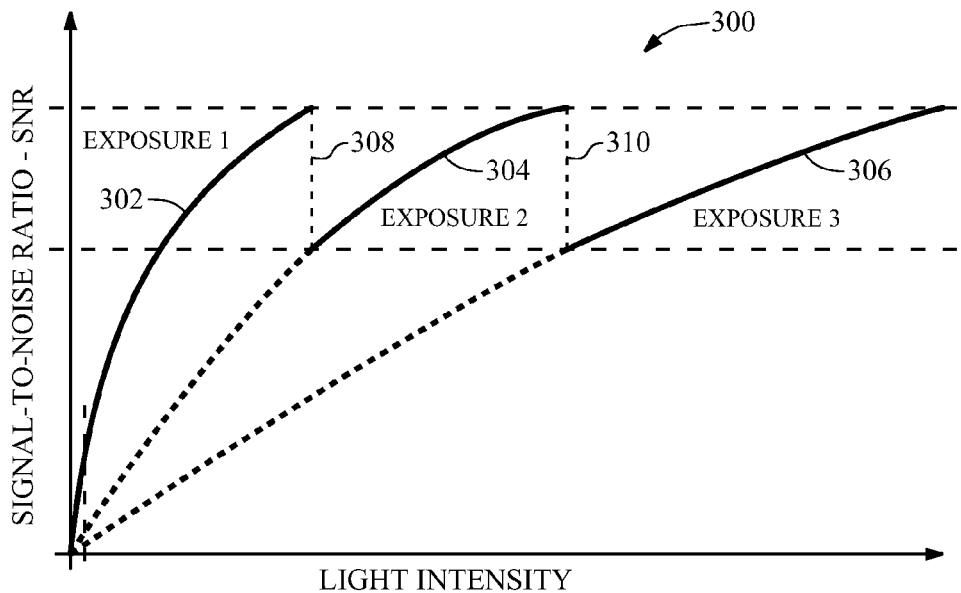

In HDR images utilizing multiple exposures, the signal-to-noise ratio ("SNR") curve can include a discontinuity in sections corresponding to transitions between the exposure times. For example, FIG. 2 shows SNR graph 200 that can correspond to a two-exposure HDR system and FIG. 3 shows SNR graph 300 that can correspond to a three-exposure HDR system. In FIG. 2, curve 202 is the SNR curve for an image signal taken with a first exposure time and curve 204 is the SNR curve for an image signal taken with a second exposure time. Since curve 204 saturates at SNR level 206 at a greater light intensity value than curve 202, the exposure time of curve 204 is shorter than the exposure time for curve 202. In other words, when a longer exposure time is used, a pixel cell will saturate (e.g., sense the maximum number of incident photons possible for that photo cell) at a lower intensity of light than for a shorter exposure. When a pixel cell saturates for its exposure time, a transition can be made on the SNR graph to a shorter exposure time, thus resulting in a discontinuity of the SNR graph. For example, SNR graph 200 shows discontinuity 208 in the transition between curve 202 and curve 204. Similarly, SNR graph 300 of FIG. 3 shows discontinuity 308 between curve 302 and curve 304 and discontinuity 310 between curve 304 and curve 306. Similarly, discontinuities can occur in a HDR imaging system utilizing four or more exposure times.

The discontinuities in the SNR of an image signal can adversely affect the image quality of an HDR image. Accordingly, when filtering noise from an HDR image signal, a noise model can be created that takes into the SNR curve discontinuities. For example, in some embodiments, the following noise model can be utilized for a two-exposure HDR image signal:

$$\sigma_i = \begin{cases} \max(\sigma_0, K \cdot \sqrt{G_a \cdot I_i}), & \text{if } I_i < T_{start} \\ f_{start} + (I_i - T_{start}) \cdot (f_{end} - f_{start})/(T_{end} - T_{start}), & \text{if } T_{start} \leq I_i < T_{end} \\ R \cdot \sigma_0 + K \cdot \sqrt{R \cdot G_a \cdot I_i}, & \text{if } I_i \geq T_{end} \end{cases} \quad (5)$$

$T_{start}$ and $T_{end}$ can be any suitable start and end transition points and, generally, can be set near the discontinuity of the SNR graph. For example, in some embodiments, $T_{end}$=Light Intensity at the Discontinuity and $T_{start}$=$T_{end}$−Transition Band. The value of Transition Band can be any suitable value (e.g., 256, 128, or any other suitable value). As used herein, the term "transition period" refers to the section of an SNR curve that is between a start transition point and its corresponding end transition point. For example, in Equation (5), the transition period would be located at light intensities where: $T_{start} \leq I_i < T_{end}$.

The noise floor, $\sigma_0$, and noise model coefficient, K, can be calculated by Equation (3) and Equation (4), respectively. $G_a$ is the analog gain of the imaging system and can be determined from camera settings of the imaging system during the image capture. $I_i$ (i=red, green, blue) is the combined image signal for the corresponding color. As used herein, the term "combined image signal" refers to a final image signal of an HDR system that can be created by combining the image signals of the multiple exposures. For example, as described above, in some embodiments a combined image signal can be created by summing weighted pixel values from each of the multiple exposures. The ratio, R, is the ratio of the exposure times of the two exposures. $f_{start}$ and $f_{end}$ can be calculated by:

$$f_{start} = \max(\sigma_0, K \cdot \sqrt{G_a \cdot T_{start}}) \quad (6)$$

$$f_{end} = R \cdot \sigma_0 + K \cdot \sqrt{R \cdot G_a \cdot T_{end}} \quad (7)$$

Figure 4:
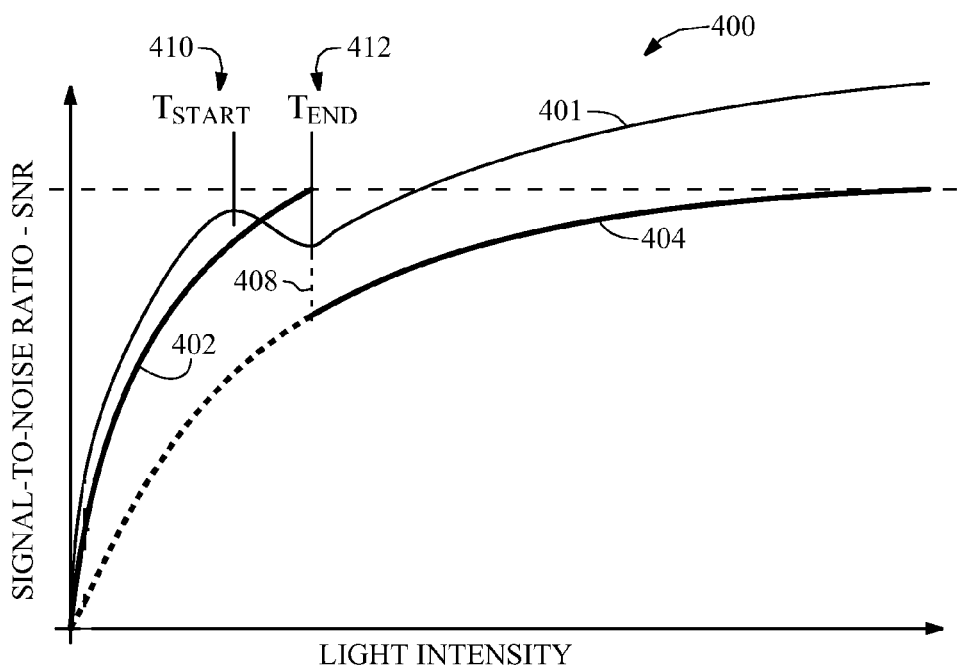

Accordingly, Equation (5) can calculate a noise model that smoothes the discontinuity of the SNR graph into a continuous function. For example, FIG. 4 shows SNR graph 400 that illustrates noise model 401 that may be calculated by Equation (5). For reference, SNR curve 402 of a first exposure, SNR curve 404 of a second exposure, and their associated discontinuity 408 are also illustrated in FIG. 4.

As illustrated by FIG. 4, noise model 401 can follow a first equation (i.e., $\max(\sigma_0, K \cdot \sqrt{G_a \cdot I_i})$) when the light intensity is below the first transition point, $T_{start}$ 410. Noise model 401 may also follow a second equation (i.e., $R \cdot \sigma_0 + K \cdot \sqrt{R \cdot G_a \cdot I_i}$) when the light intensity is above the second transition point, $T_{end}$ 412. Noise model 401 may also follow and a third equation (i.e., $f_{start} + (I_i - T_{start}) \cdot (f_{end} - f_{start})/(T_{end} - T_{start})$) when the light intensity is within the transition period (e.g., between the two transition points, $T_{start}$ 410 and $T_{end}$ 412). Accordingly, noise model 401 can smooth discontinuity 408 by, for example, creating a linear function within the transition period. The function of noise model 401 within the transition period can be determined based on attributes of the first exposure and on attributes of the second exposure. For example, within the transition period the function can be based on R, the ratio of the exposure times of the first and second exposures.

Equation (5) and the noise model described above can be expanded to create a noise model for an HDR imaging system utilizing any suitable number of exposures. For example, a noise model for a three-exposure HDR image signal can be calculated by:

$$\sigma_i = \begin{cases} \max(\sigma_0, K \cdot \sqrt{G_a \cdot I_i}), & \text{if } I_i < T_{1,start} \\ \dfrac{f_{1,start} + (I_i - T_{1,start}) \cdot (f_{1,end} - f_{1,start})}{(T_{1,end} - T_{1,start})}, & \text{if } T_{1,start} \leq I_i < T_{1,end} \\ R_1 \cdot \sigma_0 + K \cdot \sqrt{R_1 \cdot G_a \cdot I_i}, & \text{if } T_{1,end} \leq I_i < T_{2,start} \\ \dfrac{f_{2,start} + (I_i - T_{2,start}) \cdot (f_{2,end} - f_{2,start})}{(T_{2,end} - T_{2,start})}, & \text{if } T_{2,start} \leq I_i < T_{2,end} \\ R_1 \cdot R_2 \cdot \sigma_0 + K \cdot \sqrt{R_1 \cdot R_2 \cdot G_a \cdot I_i}, & \text{if } I_i \geq T_{2,end} \end{cases} \quad (8)$$

Similar to Equation (5) (i.e., the noise model for the two-exposure HDR image signal), the noise floor, $\sigma_0$, and noise model coefficient, K, can be calculated by Equation (3) and Equation (4), respectively. Also similar to Equation (5), $G_a$ is the analog gain of the imaging system and can be determined from camera settings of the imaging system during the image capture. $I_i$ (i=red, green, blue) is the combined image signal of the multiple exposures for the corresponding color. $R_1$ is the ratio of the exposure times of the first and second exposures (e.g., the two longest exposures, such as the exposures associated with curve 302 and curve 304 of FIG. 3) and $R_2$ is the ratio of the exposure times of the second and third exposures (e.g., the next two longest exposures, such as the exposures associated with curve 304 and curve 306 of FIG. 3). The values of $f_{n,start}$ (n=1, 2) and $f_{n,end}$ (n=1, 2) are calculated by:

$$f_{1,start} = \max(\sigma_0, K \cdot \sqrt{G_a \cdot T_{1,start}}) \quad (9)$$

$$f_{1,end} = R_1 \cdot \sigma_0 + K \cdot \sqrt{R_1 \cdot G_a \cdot T_{1,end}} \quad (10)$$

$$f_{2,start} = R_1 \cdot \sigma_0 + K \cdot \sqrt{R_1 \cdot G_a \cdot T_{2,start}} \quad (11)$$

$$f_{2,end} = R_1 \cdot R_2 \cdot \sigma_0 + K \cdot \sqrt{R_1 \cdot R_2 \cdot G_a \cdot T_{2,end}} \quad (12)$$

$T_{1,start}$ and $T_{1,end}$ are, respectively, the start and end transition points of the first transition period in the SNR curve of the imaging system. For example, $T_{1,start}$ and $T_{1,end}$ can be any suitable light intensity values near the discontinuity between the SNR curves of the two longest exposures (e.g., discontinuity 308 of FIG. 3). Similarly, $T_{2,start}$ and $T_{2,end}$ are, respectively, the start and end transition points of the second transition period. For example, $T_{2,start}$ and $T_{2,end}$ can be any suitable light intensity values near the discontinuity between the next two longest exposures (e.g., discontinuity 310 of FIG. 3). For example, in some embodiments $T_{1,end}$=Light Intensity at First Discontinuity, $T_{1,start}$=$T_{1,end}$−Transition Band, $T_{2,end}$=$T_{1,end}$*$R_1$, and $T_{2,start}$=$T_{2,end}$−Transition Band*$R_1$. The value of Transition Band can be any suitable value (e.g., 256, 128, or any other suitable value).

Accordingly, Equation (8) can be used to calculate a noise model for a three-exposure imaging system, where this noise model can smooth the two discontinuities of the SNR graph into a continuous function. In some embodiments, the discontinuities can be smoothed by creating a linear function within the first and second transition period (e.g., between $T_{1,start}$ and $T_{1,end}$ and between $T_{2,start}$ and $T_{2,end}$). The function within these transition periods can be determined based on attributes of two or more of the exposures of the HDR imaging system. For example, the function within the first transition period can be determined based on $R_1$, the ratio of the exposure times of the first and second exposures. Similarly, the function within the second transition period can be determined based on $R_1$ and on $R_2$, where $R_2$ is the ratio of the exposure times of the second and third exposures.

One skilled in the art can appreciate that the above-mentioned noise models and equations can be expanded to create a noise model for an HDR imaging system utilizing any suitable number of exposures. For example, by taking into account the additional SNR curves and discontinuities, a noise model can be created for a four-exposure HDR imaging system, a five-exposure HDR imaging system, or an HDR imaging system with any other suitable number of exposures.

The above noise models (e.g., Equation (5) and Equation (8)) can be used to filter noise from an HDR image. As mentioned above, these noise models can depend upon characteristics of the imaging system and upon the light intensity value sensed by a particular pixel cell. Moreover, in some embodiments, the above noise models can be utilized by a filter that removes noise based on the local image structure. For example, a Bayer Filter is described below. A Bayer Filter may filter the image signal of a particular pixel cell based on the values of nearby (e.g., local) pixel cells and based on a noise model. However, one skilled in the art can appreciate that the above-mentioned noise models (e.g., Equation (5) and Equation (8)) may be used with any suitable filters and are not limited for use with a Bayer Filter.

When filtering the image signal of a pixel cell, a Bayer Filter may perform a different filtering process based on whether the pixel cell is designed to sense a red, green, or blue light intensity (e.g., whether the pixel cell is a "red pixel", "green pixel", or "blue pixel"). Generally, the pixel cells of a Bayer Filter can be arranged in an array, where (i, j) can be used to denote the (row, column) location of a particular pixel cell. In particular, R(i, j) can denote the red light intensity value sensed by a red pixel at (i,j), B(i, j) can denote the blue light intensity value sensed by a blue pixel at (i,j), and G(i, j) can denote the green light intensity value sensed by a green pixel at (i,j). Moreover, although the pixels cells of a Bayer Filter are typically arranged in a pattern which alternates the colors of the pixel cells, one skilled in the art can appreciate that the pixel cells can be arranged in any suitable pattern and are not limited to such a pattern. In some embodiments, the Bayer filter can include 50% green pixels, 25% red pixels, and 25% blue pixels to coincide with the human eye's greater sensitivity to green light. As used herein, when filtering the image signal of a pixel cell of a HDR Imaging System, the "image signal" can refer to the combined image signal of the multiple exposures sensed by that pixel cell.

When filtering a green pixel, a pixel array window of the Bayer Filter surrounding that green pixel can be analyzed. For example, FIG. 5 shows pixel array window 500 that can be analyzed to filter the image signal from green pixel 502 (i.e., to filter G(0,0)). Although pixel array window 500 is illustrated as a 5×5 pixel array window, one skilled in the art can appreciate that any suitably-sized pixel array window can alternatively be used (e.g., 4×5, 5×4, or any other suitable pixel array window size). As will be described in greater detail below, the weighted sums of the light intensity values sensed by the green pixels within pixel array window 500 (i.e., light intensity values sensed by pixels 502-514) can be utilized to determine a filtered value for G(0,0). The filtered value for G(0,0) can be denoted by $\tilde{G}(0,0)$ $\tilde{G}(0,0)$ may then be used to replace the value of G(0,0) within the HDR image. Accordingly, since the surrounding green pixels within pixel array window 500 can be used during the filtering process to determine $\tilde{G}(0,0)$, G(0,0) is filtered based on the local image structure (e.g., based on the nearby pixel cells).

The filtered value for G(0,0) can be determined by:

$$\tilde{G}(0,0) = \frac{\left[\sum_{(m,n) \in M_G} w(m,n) \cdot G(m,n)\right]}{\sum_{(m,n) \in M_G} w(m,n)} \quad (13)$$

$M_G$ can denote the locations of pixel cells in pixel array window 500 that are green pixel cells. In other words:

$$M_G(m,n) = \begin{cases} 1, & \text{if } (m,n) \text{ is a green pixel location} \\ 0, & \text{otherwise} \end{cases} \quad (14)$$

The filter coefficients, w(m,n) are determined by:

$$w(m, n) = \begin{cases} 3, & \text{if } |G(m, n) - G(0, 0)| \leq c_1\sigma_g \\ 2, & \text{if } c_1\sigma_g < |G(m, n) - G(0, 0)| \leq c_2\sigma_g \\ 1, & \text{if } c_2\sigma_g < |G(m, n) - G(0, 0)| \leq c_3\sigma_g \\ 0, & \text{otherwise} \end{cases} \quad (15)$$

$\sigma_g$ is the noise level of the pixel being filtered (e.g., G(0,0)) and can be calculated using any appropriate noise model. For example, based on the number of exposures being utilized by the HDR imaging system, $\sigma_g$ can be calculated using Equation (5), Equation (8), or any other suitable noise model. The scaling coefficients, $c_1$, $c_2$, and $c_3$, can determine the sensitivity of the filter and may be any suitable value. For example, in some embodiments, $c_1=1$, $c_2=2$, and $c_3=3$.

Accordingly, Equation (13) can calculate a weighted sum of the values of all green pixels within pixel array window 500. The weight that is given to the value of a particular green pixel can be determined based on the difference between the particular green pixel's value and G(0,0), and also based on how this difference compares to the noise level of G(0,0). If the difference is large, that green pixel value can be weighted less or even removed from the filtering calculations. In this manner, Equation (13) can filter noise from the image signal of a green pixel while still suitably maintaining changes between images features, image lines, or other image details.

FIG. 6 shows pixel array window 600 that can be analyzed to filter the image signal of red pixel 602 (e.g., to filter R(0,0)). Although pixel array window 600 is illustrated as a 5×10 pixel array window, one skilled in the art can appreciate that any suitably-sized pixel array window can alternatively be used (e.g., 5×9, 4×10, or any other suitable pixel array window size). Similar to filtering the image signal from a green pixel, the weighted sums of the light intensity values of the red pixels within pixel array window 600 can be utilized to determine a filtered value for R(0,0). The filtered value for R(0,0) can be denoted by $\tilde{R}(0,0)$. $\tilde{R}(0,0)$ may then be used to replace the value of R(0,0) within the HDR image.

In some embodiments, when filtering the image signal from a red pixel cell, the correlation between red light intensities and green light intensities can be taken into account. For example, the intensity of green light at a particular red pixel can be estimated. The difference between the red light intensity at this red pixel and the estimated green light intensity can then be calculated. Additionally, the sum of red light intensity and the estimated green light intensity can be calculated. The differences and sums of these light intensities may then be used in the filtering process.

The estimated green light intensity can be calculated through any suitable method. For example, in some embodiments, the light intensity value of a green pixel to the left of the red pixel of interest can be used at the estimated green light intensity. As another example, the light intensity value of a green pixel to the right of the red pixel of interest can be used at the estimated green light intensity. As yet another example, the averaged value of the light intensity values of the four green pixels surrounding the red pixel of interest can be used at the estimated green light intensity. In the following equations, the value of the green pixel to the left of the red pixel of interest is used as the estimated green light intensity. However, one skilled in the art can appreciate that any suitable method of estimating the green light intensity could alternatively be used.

The difference signal for the red pixels in pixel array window 600 can be calculated by:

$$D_R(2i,2j) = R(2i,2j) - G(2i,2j-1) \quad (16)$$

where i={−1, 0, 1} and j={−2, −1, 0, 1, 2}. The sum signal for the red pixels in pixel array window 600 can be calculated by:

$$S_R(2i,2j) = R(2i,2j) + G(2i,2j-1) \quad (17)$$

where i={−1, 0, 1} and j={−2, −1, 0, 1, 2}. The difference signal and sum signal may then be filtered, respectively, by:

$$\tilde{D}_R(0, 0) = \frac{\left[\sum_{i=-1}^{1}\sum_{j=-2}^{2} a(2i, 2j) \cdot D_R(2i, 2j)\right]}{\sum_{i=-1}^{1}\sum_{j=-2}^{2} a(2i, 2j)} \quad (18)$$

$$\tilde{S}_R(0, 0) = \frac{\left[\sum_{i=-1}^{1}\sum_{j=-2}^{2} b(2i, 2j) \cdot S_R(2i, 2j)\right]}{\sum_{i=-1}^{1}\sum_{j=-2}^{2} b(2i, 2j)} \quad (19)$$

where a(2i,2j) (i=−1, 0, 1; j=−2, −1, 0, 1, 2) and b(2i,2j) (i=−1, 0, 1; j=−2, −1, 0 1, 2) are filter coefficients defined, respectively, by:

$$a(2i, 2j) = \begin{cases} 1, & \text{if } |D_R(2i, 2j) - D_R(0, 0)| \leq 3r_{rgD}\sigma_r \\ 0, & \text{otherwise} \end{cases} \quad (20)$$

$$b(2i, 2j) = \begin{cases} 1, & \text{if } |S_R(2i, 2j) - S_R(0, 0)| \leq 3r_{rgS}\sigma_r \\ 0, & \text{otherwise} \end{cases} \quad (21)$$

$\sigma_r$ is the noise level of the pixel being filtered (e.g., the noise level of R(0,0)) and can be calculated using any appropriate noise model. For example, based on the number of exposures being utilized by the HDR imaging system, $\sigma_r$ can be calculated using Equation (5), Equation (8), or any other suitable noise model. The noise ratios, $r_{rgD}$ and $r_{rgS}$, are associated with, respectively, the ratio between the noise level of difference signal to the noise level of R(0,0) and the ratio between the noise level of the sum signal to the noise level of R(0,0). For example, in some embodiments, $r_{rgD}=\sqrt{2}$ and $r_{rgS}=\sqrt{2}$. The filtered value for R(0,0) can be calculated by averaging the filtered difference signal and filtered sum signal. For example, the filtered value of R(0,0) can be calculated by:

$$\tilde{R}(0,0) = [\tilde{D}_R(0,0) + \tilde{S}_R(0,0)]/2 \quad (22)$$

The image signal from blue pixels can be filtered in a manner similar to a red pixel. For example, FIG. 7 shows pixel array window 700 that can be used when filtering green pixel 702. Although pixel array window 700 is illustrated as a 5×10 pixel array window, one skilled in the art can appreciate that any suitably-sized pixel array window can alternatively be used (e.g., 5×9, 4×10, or any other suitable pixel array window size).

Also similar to the filtering of the image signal of a red pixel, the correlation between blue light intensities and green light intensities can be taken into account during the filtering process. For example, a difference signal representing the difference between the image signal of a blue pixel in pixel array window 700 and an estimated green light intensity at that blue pixel can be calculated. Additionally, a sum signal representing the sum of the image signal of the blue pixel and an estimated green light intensity at that blue pixel can be calculated. These difference and sum signals may then be filtered. A final, filtered value for B(0,0) may then be calculated based on the average of the filtered difference and sum signals. The filtered value for B(0,0) can be denoted by $\tilde{B}(0,0)$. $\tilde{B}(0,0)$ may then be used to replace the value of B(0,0) within the HDR image.

In the descriptions and equations below, the estimated green light intensity is calculated as the light intensity of the green pixel to the right of the blue pixel of interest. However, one skilled in the art can appreciate that any suitable method of estimating the green light intensity at the blue pixel of interest can be used (e.g., using the value of the green pixel to the right, using an averaged value of the surrounding green pixels, or any other suitable method.)

The difference signal for the blue pixels in pixel array window 700 can be calculated by:

$$D_B(2i,2j) = B(2i,2j) - G(2i,2j+1) \quad (23)$$

where i={−1, 0, 1} and j={−2, −1, 0, 1, 2}. The sum signal for the blue pixels in pixel array window 700 can be calculated by:

$$S_B(2i,2j) = B(2i,2j) + G(2i,2j+1) \quad (24)$$

where i={−1, 0, 1} and j={−2, −1, 0, 1, 2}. The difference signal and sum signal may then be filtered, respectively, by:

$$\tilde{D}_B(0,0) = \frac{\left[\sum_{i=-1}^{1}\sum_{j=-2}^{2} a(2i,2j) \cdot D_B(2i,2j)\right]}{\sum_{i=-1}^{1}\sum_{j=-2}^{2} a(2i,2j)} \quad (25)$$

$$\tilde{S}_B(0,0) = \frac{\left[\sum_{i=-1}^{1}\sum_{j=-2}^{2} b(2i,2j) \cdot S_B(2i,2j)\right]}{\sum_{i=-1}^{1}\sum_{j=-2}^{2} b(2i,2j)} \quad (26)$$

where a(2i,2j) (i=−1, 0, 1; j=−2, −1, 0, 1, 2) and b(2i,2j) (i=−1, 0, 1; j=−2, −1, 0, 1, 2) are filter coefficients defined, respectively, by:

$$a(2i,2j) = \begin{cases} 1, & \text{if } |D_B(2i,2j) - D_B(0,0)| \leq 3r_{rgD}\sigma_b \\ 0, & \text{otherwise} \end{cases} \quad (27)$$

$$b(2i,2j) = \begin{cases} 1, & \text{if } |S_B(2i,2j) - S_B(0,0)| \leq 3r_{rgS}\sigma_b \\ 0, & \text{otherwise} \end{cases} \quad (28)$$

$\sigma_b$ is the noise level of the pixel being filtered (e.g., the noise level of B(0,0)) and can be calculated using any appropriate noise model. For example, based on the number of exposures being utilized by the HDR imaging system, $\sigma_b$ can be calculated using Equation (5), Equation (8), or any other suitable equation. The noise ratios, $r_{rgD}$ and $r_{rgS}$, are associated with the ratio between the noise level of, respectively, the difference signal or the sum signal to the noise level of B(0,0). For example, in some embodiments, $r_{rgD} = \sqrt{2}$ and $r_{rgS} = \sqrt{2}$. The filtered value for B(0,0) can be calculated by averaging the filtered difference and sum signals. For example, the filtered value of B(0,0) can be calculated by:

$$\tilde{B}(0,0) = [\tilde{D}_B(0,0) + \tilde{S}_B(0,0)]/2 \quad (29)$$

Figure 8:
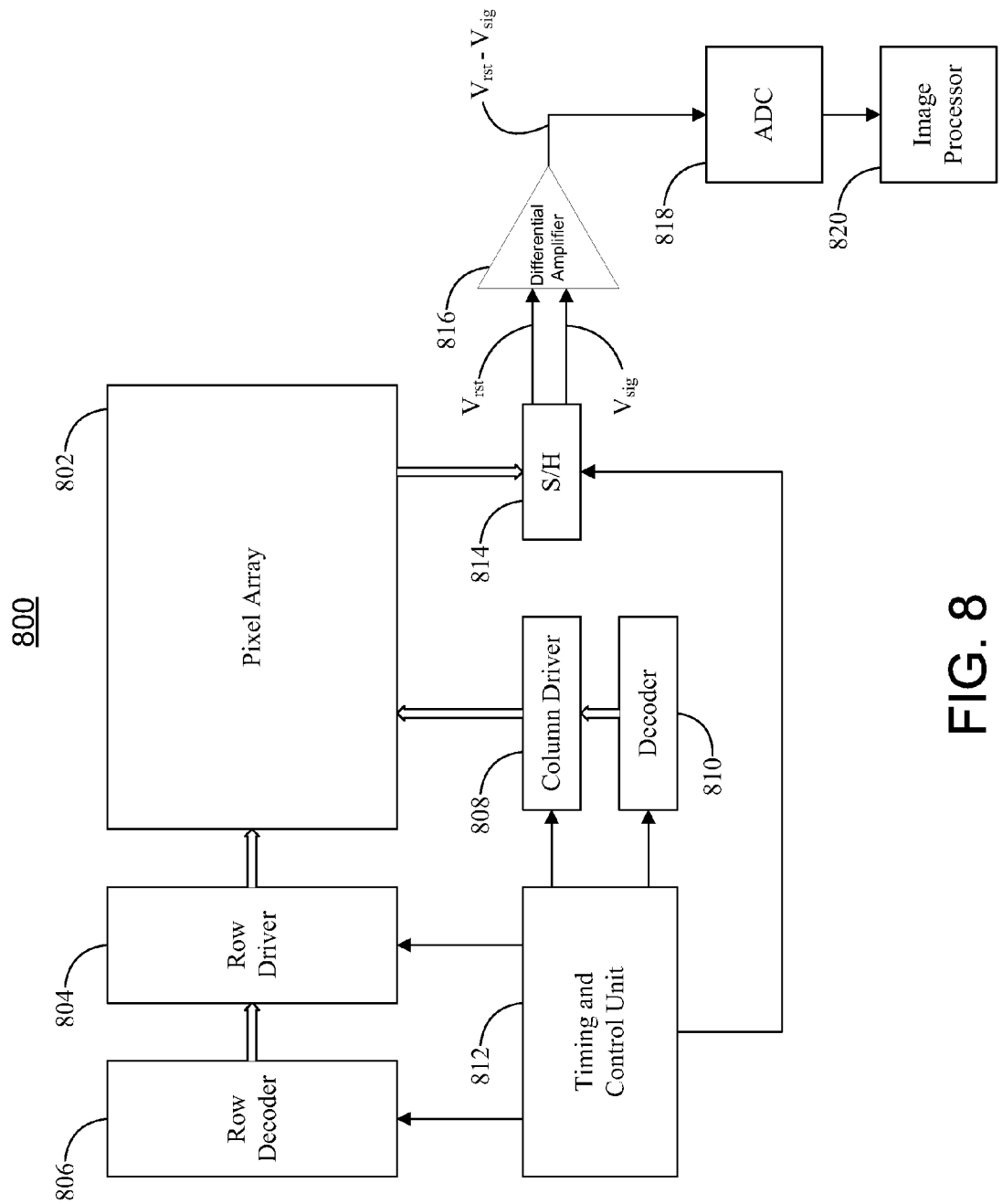
FIGS. 8-9 show illustrative schematics of imaging systems in accordance with some embodiments of the invention.

The HDR imaging systems described above can be implemented in hardware, software, or in any combination of hardware and software. For example, FIG. 8 shows a schematic view of imaging system 800 that can be used for creating HDR images. For example, in some embodiments, imaging system 800 could represent a CMOS imagining system.

Imaging system 800 can have pixel array 802 that can included pixels cells arranged in a predetermined number of columns and rows. Each pixel cell can be configured to receive incident photons and convert the incident photons into electrical signals. Furthermore, each pixel cell can be configured to sense the light intensity for either red, green, or blue incident light.

In operation, rows of pixel cells of pixel array 802 can be selectively activated and/or read from pixel array 802. For example, the rows can be selectively activated by row driver 804 in response to row driver 804 receiving a row address from row decoder 806. Similarly, columns of pixel cells of pixel array 802 can be selectively activated and/or read from pixel array 802. For example, the columns can be selectively activated by column driver 808 in response to column driver 808 receiving a column address from column decoder 810. Accordingly, each pixel cell of pixel array 802 can be selectively activated and/or read from pixel array 802 by providing the appropriate row and column address with, respectively, row decoder 806 and column decoder 810. Timing and control unit 812 can instruct row decoder 806 and column decoder 810 to select an appropriate row and column line in order to read a particular pixel. Furthermore, timing and control unit 812 can instruct row driver 804 and column driver 808 to apply an appropriate driving voltage to the drive transistors of the selected row and column lines.

Imaging system 800 can include sampling and hold circuitry ("S/H") 814, that can be controlled by timing and control unit 812. Each pixel cell of pixel array 802 can generally output a pixel reset signal ("$V_{rst}$") and a pixel image signal ("$V_{sig}$"), which may be received by S/H 814. For example, S/H 814 may receive $V_{rst}$ and $V_{sig}$ for a particular pixel cell when that pixel cell is selected by row decoder 806 and column decoder 810. $V_{rst}$ can represent a reset state of a pixel cell. $V_{sig}$ can represent the amount of charge generated by the photosensor in a pixel cell in response to incident light upon the pixel cell during an integration period. S/H 814 can sample, hold, and amplify $V_{rst}$ and $V_{sig}$. For example, in some embodiments, S/H 814 can include capacitors that may be used to store the $V_{rst}$ signal and the $V_{sig}$ signal.

S/H 814 may then output the amplified versions of $V_{rst}$ and $V_{sig}$ to differential amplifier 816. Differential amplifier 816 can determine the differential signal, $V_{rst} - V_{sig}$. This differential signal can represent, for example, the actual pixel output with common-mode noise eliminated.

The differential signal, $V_{rst}$ and $V_{sig}$, can be digitized by analog to digital converter ("ADC") 818. ADC 818 may then communicate the digitized signals to image processor 820. Image processor 820 can create a digital image from the digitized signals in any suitable manner. For example, as described above, image processor 820 can combine multiple exposures to create an HDR digital image. As another example, image processor 820 can use any of the equations, noise reduction methods, or filters described above to remove noise from the digital image. In some embodiments, image processor 820 can implement (e.g., either in hardware, software, or both) one or more of Equation (5), Equation (8), utilize a Bayer Filter or any other suitable noise filter, or any combination of the above to create a digital HDR image. Image processor 820 can additionally perform any suitable image processing or image transforms on the digital image such as, for example, image dewarping, image rotations, image perspective adjustments, image panning, image tilting, imaging zooming, or any other suitable image processing.

In some embodiments, one or more of the components of imaging system 800 can be combined or omitted. In some embodiments, imaging system 800 can include other components not combined or included in those shown in FIG. 8, or several instances of the components shown in FIG. 8. Furthermore, although imaging device 800 has been described with reference to a CMOS imaging system, one skilled in the art can appreciate that any suitable imaging system could be used. For example, the embodiments described herein could be used with a CCD imaging system, or any other suitable imaging system. Additionally, one skilled in the art can appreciate that the pixel cell signals (e.g., $V_{rst}$ and $V_{sig}$) or processed pixel signals (e.g., $V_{rst}$-$V_{sig}$, the digitized signal, or any other processed signal) can be output, stored, and/or filtered elsewhere, for example, in a system as described in relation to FIG. 9 or in a stand-alone image processing system.

Figure 9:
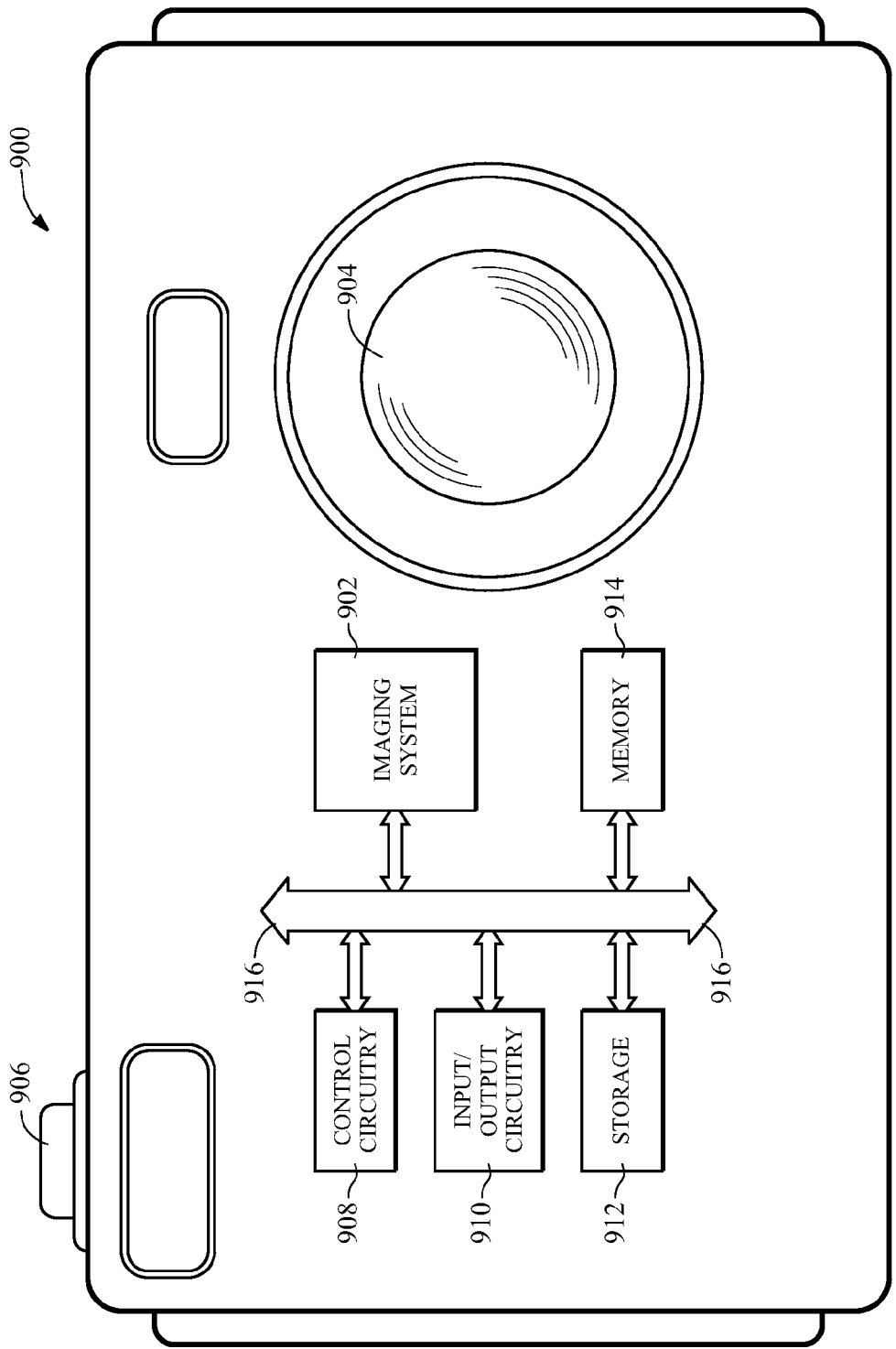

FIG. 9 shows system 900 that can include an imaging system, such as imaging system 902. Imaging system 902 can correspond to, for example, imaging system 800 of FIG. 8. System 900 can include any suitable system with an imaging system such as, for example, a camera, a desktop computer, a laptop computer, any other suitable computer system, a scanner, a vehicle navigation system, a cellular telephone, a security system, a motion detection system, an image stabilization system, or any other suitable system.

System 900 can include lens 904, control circuitry 908, input/output circuitry 910, storage 912, memory 914, and bus 916. In some embodiments, one or more of the components of system 900 can be combined or omitted (e.g., storage 912 and memory 914 can be combined). In some embodiments, system 900 can include other components not combined or included in those shown in FIG. 9 (e.g., motion detection components or a power supply), or several instances of the components shown in FIG. 9. For the sake of simplicity, only one of each of the components is shown in FIG. 9.

Lens 904 can focus an image on imaging system 902 when, for example, shutter release button 906 is pressed. In some embodiments, the image could be focused onto a pixel array of imaging system 902 such as, for example, pixel array 802 of FIG. 8.

Control circuitry 908 can include any processing circuitry or processor operative to control the operations and performance of system 900. For example, control circuitry 908 can be used to run operating system applications, firmware applications, or any other application. In some embodiments, control circuitry 908 can drive a display and process inputs received from a user interface of system 900. In some embodiments, control circuitry 908 can perform some or all of the functions of an image processor of imaging system 902 such as, for example, image processor 820 of FIG. 8. In some embodiments, control circuitry 908 can perform some or all of the functions of a control unit of imaging system 900 such as, for example, timing and control unit 812 of FIG. 8.

Input/output circuitry 910 can be operative to convert (and encode/decode, if necessary) analog signals and other signals into digital data, and vice-versa. For example, input/output circuitry 910 can be operative to convert signals received from any suitable input device of system 900 such as, for example, a keyboard, a mouse, a switch, a button, an accelerometer, shutter release button 906, or a photodetector into digital data. In some embodiments, input/output circuitry 910 can perform some or all of the signal conversion operations of imaging system 900 such as, for example, operations performed by ADC 818 of FIG. 8.

Storage 912 and memory 914 can include, for example, one or more storage mediums including a hard-drive, solid state drive, flash memory, ROM, cache memory, RAM, or any other suitable type of storage component, or any combination thereof. In some embodiments, memory 912 and storage 916 can be combined as a single storage medium. In some embodiments, memory 912 or storage 916 can be a removable storage medium, such as removable flash memory. One or both of storage 912 and memory 914 can store any suitable data such as, for example, digital images created by an image processor (e.g., image processor 820 of FIG. 8) of imaging system 900.

In some embodiments, system 900 can include bus 916 operative to provide a data transfer path for transferring data to, from, or between imaging system 902, control circuitry 908, input/output circuitry 910, storage 912, memory 914, and any other component included in system 900.

It will be apparent to those of ordinary skill in the art that methods involved in the invention may be embodied in a computer program product that includes a machine readable and/or usable medium. For example, such a computer usable medium may consist of a read only memory device, such as a CD ROM disk or conventional ROM device, or a random access memory, such as a hard drive device or a computer diskette, or flash memory device having a computer readable program code stored thereon.

The above described embodiments of the invention are presented for purposes of illustration and not of limitation.

What is claimed is:

1. A method of creating a noise model comprising:
determining, by control circuitry of an imaging device, a first noise model for a first light intensity period, wherein the first light intensity period is associated with a first exposure of a multiple-exposure high dynamic range image ("HDR image");
determining, by the control circuitry, a second noise model for a second light intensity period, wherein the second light intensity period is associated with a second exposure of the HDR image;
determining, by the control circuitry, a third noise model for a first transition period comprising light intensity values between the first and second light intensity periods, wherein the third noise model is based on a ratio of attributes of at least the first and second exposures; and
filtering, by the control circuitry, noise from the HDR image based on at least the first noise model, the second noise model, and the third noise model.

2. The method of claim 1, wherein the first exposure is taken with a first exposure time, the second exposure is taken with a second exposure time, and wherein the ratio of attributes comprises a ratio of the first exposure time to the second exposure time.

3. The method of claim 1, wherein the third noise model is defined by a linear function.

4. The method of claim 1, wherein the third noise model smoothes a discontinuity of a signal-to-noise ratio ("SNR") curve of the HDR image and wherein the discontinuity is associated with a transition region between an SNR curve of the first exposure and an SNR curve of the second exposure.

5. The method of claim 1, wherein the first noise model is described by the equation: $\sigma_t = \max(\sigma_0, K \cdot \sqrt{G_a \cdot I_t})$, wherein $\sigma_0$ is a noise floor, K is a noise model coefficient, $G_a$ is an analog gain of the imaging device, and $I_t$ is an image signal level of the HDR image.

6. The method of claim 1, wherein the second noise model is described by the equation: $\sigma_t = R \cdot \sigma_0 + K \cdot \sqrt{R \cdot G_a \cdot I_t}$, wherein R is a ratio of exposure times of the first exposure and the second exposure, $\sigma_0$ is a noise floor, K is a noise model coefficient, $G_a$ is an analog gain of the imaging device, and $I_i$ is an image signal level of the HDR image.

7. The method of claim 1, further comprising:
determining, by the control circuitry, a fourth noise model for a third light intensity period, wherein the third light intensity period is associated with a third exposure of the HDR image; and
determining, by the control circuitry, a fifth noise model for a second transition period comprising light intensity values between the second and third light intensity periods, wherein the fifth noise model is associated with attributes of at least the first, second, and third exposure.

8. A method comprising:
determining, by control circuitry of a high dynamic range ("HDR") imaging system, a start transition point on a signal-to-noise ratio ("SNR") curve of the HDR imaging system, wherein the HDR imaging system is operable to generate an HDR image from a plurality of exposures;
determining, by the control circuitry, an end transition point on the SNR curve, wherein the start transition point and the end transition point enclose a discontinuity of the SNR curve;
generating, by the control circuitry, a noise model for the HDR imaging system, wherein the noise model between the start transition point and the end transition point is a continuous function based on at least one ratio of exposure times of the plurality of exposures; and
filtering, by the control circuitry, noise from the HDR image using at least the noise model.

9. The method of claim 8, further comprising:
determining, by the control circuitry, two or more pairs of start transition points and end transition points, wherein each pair encloses a different discontinuity of the SNR curve; and
wherein the noise model between each pair is a continuous function based on at least one ratio of exposure times of the plurality of exposures.

10. The method of claim 8, further comprising:
generating, by the control circuitry, a combined image signal of the HDR image by summing a plurality of weighted pixel values, wherein each pixel value is associated with a particular exposure of the plurality of exposures.

11. An imaging system comprising:
a pixel array comprising a plurality of pixel cells, wherein each pixel cell is operable to:
generate at least a first image signal and a second image signal, wherein the first image signal is generated in response to the pixel cell being exposed for a first exposure time and the second image signal is generated in response to the pixel cell being exposed for a second exposure time;
an image processor operable to:
generate a noise model for a high dynamic range ("HDR") image signal of the imaging system, wherein the noise model comprises at least one transition period that is based on the ratio of the first exposure time to the second exposure time; and
a noise filter operable to:
remove at least a portion of noise from the HDR image signal based on at least the noise model.

12. The imaging system of claim 11, wherein the transition period smoothes a discontinuity of the signal-to-noise ratio of the HDR image signal into a continuous function.

13. The imaging system of claim 11, wherein the image processor is further operable to generate the high dynamic range image signal from at least the first image signal and the second image signal.

14. The imaging system of claim 11, wherein the noise filter is a Bayer Filter and is further operable to remove the at least a portion of noise based on local image structure.

15. The imaging system of claim 11, wherein:
the first and second image signals are generated by a particular pixel cell that senses only green light; and
the noise filter is further operable to remove the at least a portion of noise based on a normalized, weighted sum of image signals generated by pixel cells that sense only green light and that neighbor the particular pixel cell.

16. The imaging system of claim 15, wherein the pixel cells neighboring the particular pixel cell are located in a 5×5 window surrounding the particular pixel cell.

17. The imaging system of claim 11, wherein:
the first and second image signal are generated by a particular pixel cell that senses only red light; and
the noise filter is further operable to remove the at least a portion of noise based on:
a plurality of image signals generated by local pixel cells, wherein the local pixel cells sense only red light and neighbor the particular pixel cell; and
a plurality of estimated image signals that would be produced by pixel cells that sense only green light and that are located at the location of each local pixel cell.

18. The imaging system of claim 11, wherein:
the first and second image signal are generated by a particular pixel cell that senses only blue light; and
the noise filter is further operable to remove the at least a portion of noise based on:
a plurality of image signals generated by local pixel cells, wherein the local pixel cells sense only blue light and neighbor the particular pixel cell; and
a plurality of estimated image signals that would be produced by pixel cells that sense only green light and that are located at the location of each local pixel cell.

* * * * *